(12) United States Patent
Wee et al.

(10) Patent No.: US 11,307,340 B2
(45) Date of Patent: Apr. 19, 2022

(54) POLARIZING PLATE WITH ADHESIVE LAYER HAVING SPECIFIED HAZE AND LIQUID CRYSTAL DISPLAY DEVICE COMPRISING SAME

(71) Applicant: SAMSUNG SDI CO., LTD., Yongin-si (KR)

(72) Inventors: Dong Ho Wee, Suwon-si (KR); Young Min Kim, Suwon-si (KR); Young Oh, Suwon-si (KR); Yong Un Jung, Suwon-si (KR); Young Hyun Ju, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 357 days.

(21) Appl. No.: 16/344,780

(22) PCT Filed: Sep. 27, 2017

(86) PCT No.: PCT/KR2017/010710
§ 371 (c)(1),
(2) Date: Apr. 24, 2019

(87) PCT Pub. No.: WO2018/080036
PCT Pub. Date: May 3, 2018

(65) Prior Publication Data
US 2019/0243042 A1 Aug. 8, 2019

(30) Foreign Application Priority Data
Oct. 31, 2016 (KR) .................. 10-2016-0143820

(51) Int. Cl.
*G02B 1/11* (2015.01)
*G02B 1/14* (2015.01)
(Continued)

(52) U.S. Cl.
CPC ............ *G02B 5/305* (2013.01); *G02B 1/11* (2013.01); *G02B 1/14* (2015.01); *G02B 5/30* (2013.01); *G02F 1/133528* (2013.01)

(58) Field of Classification Search
CPC ............. G02B 1/11–14; G02B 5/0215; G02B 5/30–3091; G02B 27/28–288;
(Continued)

(56) References Cited

U.S. PATENT DOCUMENTS

2007/0259161 A1* 11/2007 Kato .................. G02B 1/105
428/212
2016/0187682 A1* 6/2016 Oh .................... G02B 5/0231
349/96
(Continued)

FOREIGN PATENT DOCUMENTS

CN 105929476 A 9/2016
JP 2006-251659 A 9/2006
(Continued)

OTHER PUBLICATIONS

Chinese Office Action from corresponding Chinese Patent Application No. 201780067419.0, Chinese Office Action dated Nov. 2, 2020 (8 pgs.).

*Primary Examiner* — Ryan S Dunning
(74) *Attorney, Agent, or Firm* — Lewis Roca Rothgerber Christie LLP

(57) ABSTRACT

Provided are a polarizing plate and a liquid crystal display device comprising the same, wherein the polarizing plate comprises a polarizer, a contrast ratio improvement film, an adhesive layer, and an antireflection film, which are sequentially laminated therein, the contrast ratio improvement film comprises a first protective layer, and a first resin layer and a second resin layer which are opposite to each other, the first resin layer includes an optical pattern including a
(Continued)

pattern portion having a flat portion on one surface opposite to the second resin layer, and the adhesive layer has a haze of about 5% to about 40%.

21 Claims, 3 Drawing Sheets

(51) Int. Cl.
*G02B 5/30* (2006.01)
*G02F 1/1335* (2006.01)

(58) Field of Classification Search
CPC ......... G02F 1/133504; G02F 1/133507; G02F 1/133528–13355; G02F 1/133606; G02F 1/133607
See application file for complete search history.

(56) References Cited

U.S. PATENT DOCUMENTS

2016/0252665 A1* 9/2016 Lee .................. G02B 5/305
 359/489.07
2019/0285937 A1* 9/2019 Fuchida ............... G02B 5/02

FOREIGN PATENT DOCUMENTS

| | | |
|---|---|---|
| JP | 2012-123210 A | 6/2012 |
| JP | 2016-161943 A | 9/2016 |
| KR | 10-2009-0083086 A | 8/2009 |
| KR | 10-2011-0126921 A | 11/2011 |
| KR | 10-2013-0075227 A | 7/2013 |
| KR | 10-2016-0065412 A | 6/2016 |
| WO | WO 2017/014089 A1 | 1/2017 |

* cited by examiner

[Figure 1]
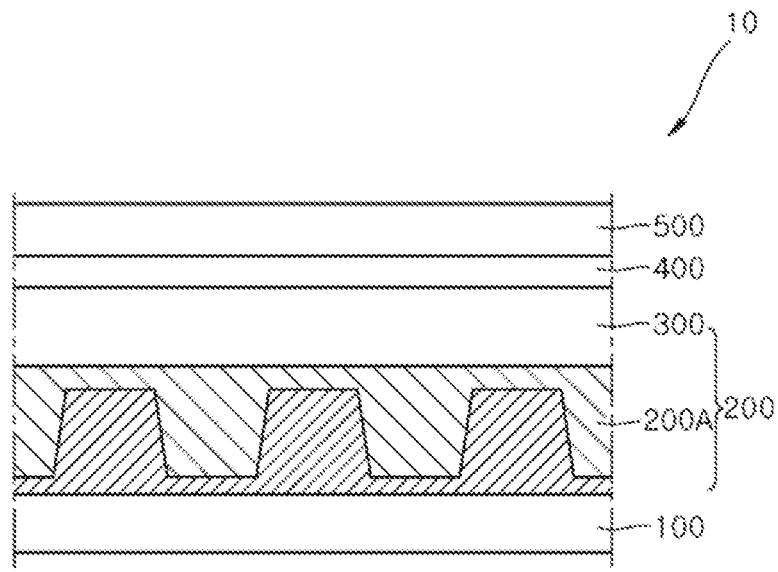
[Figure 2]
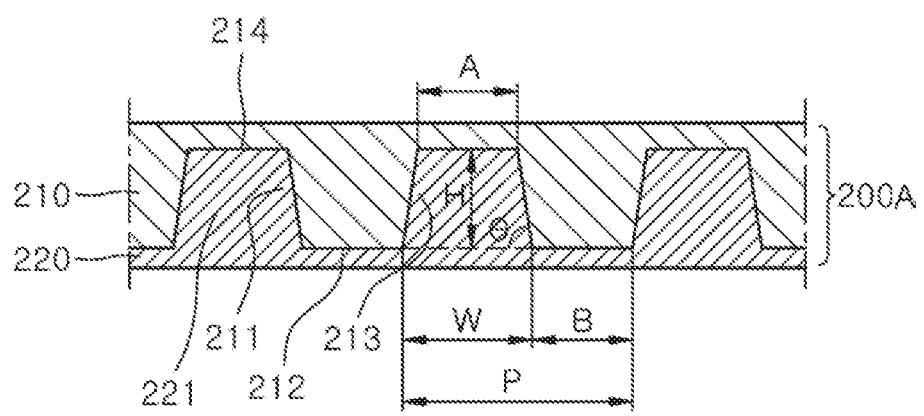

[Figure 3]
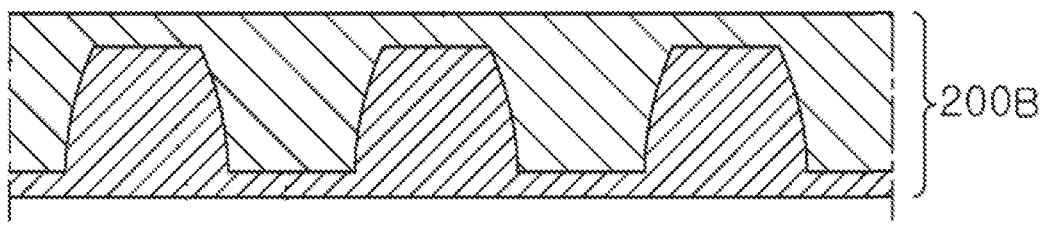
[Figure 4]
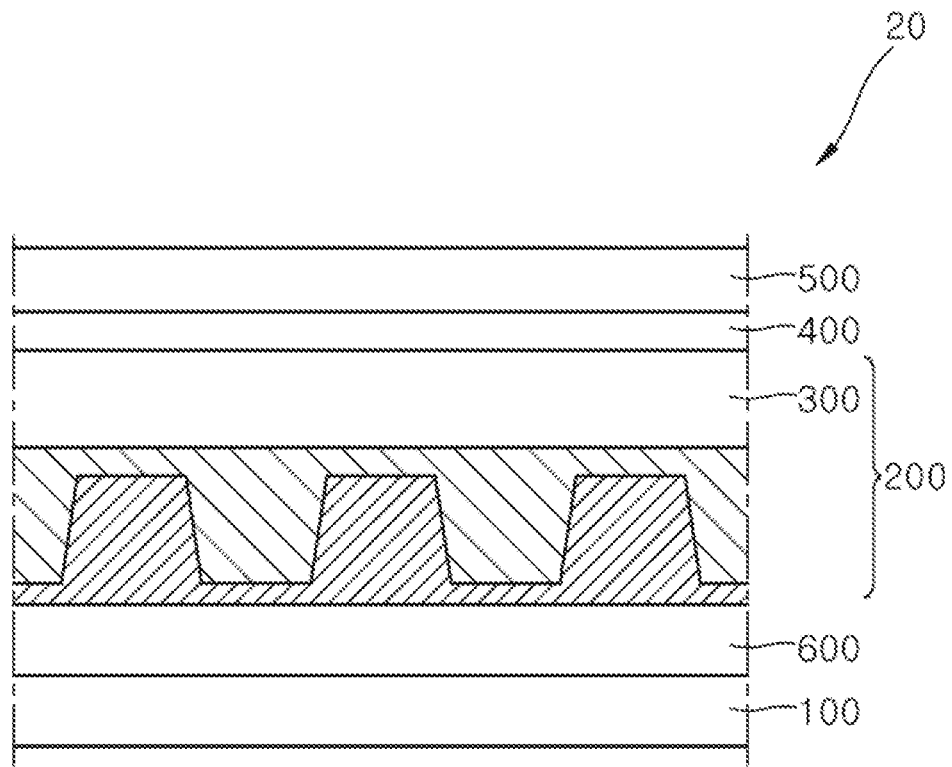

[Figure 5]
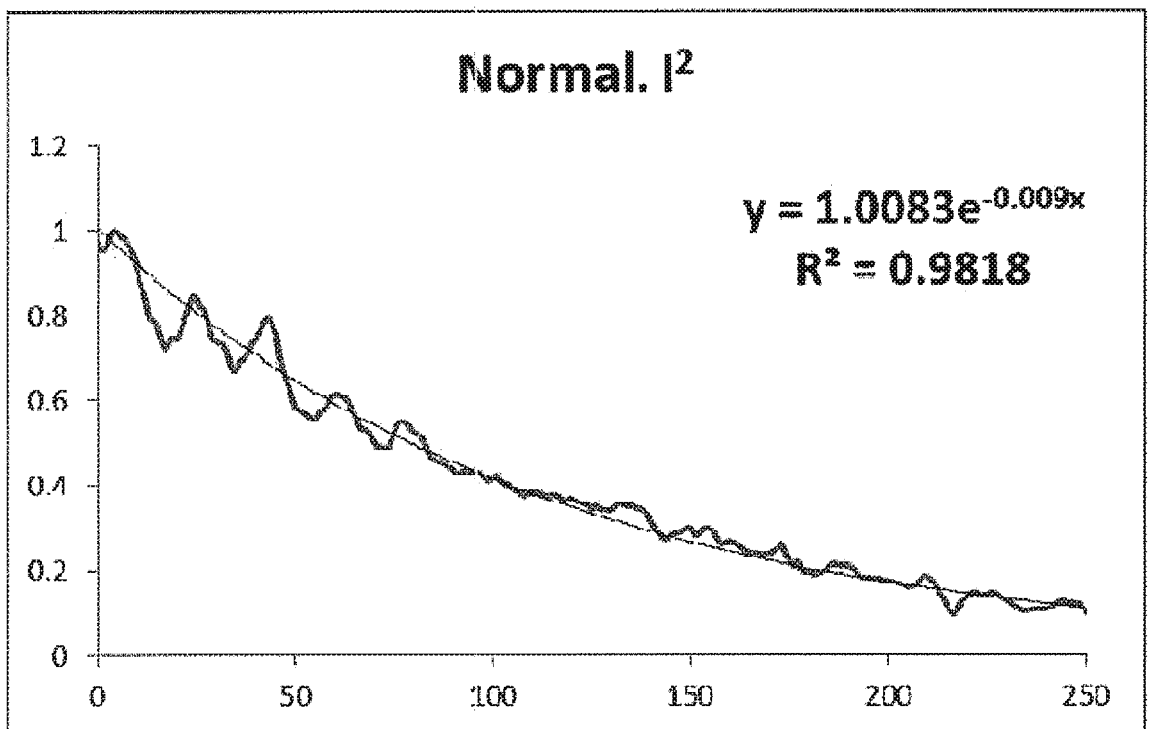
[Figure 6]
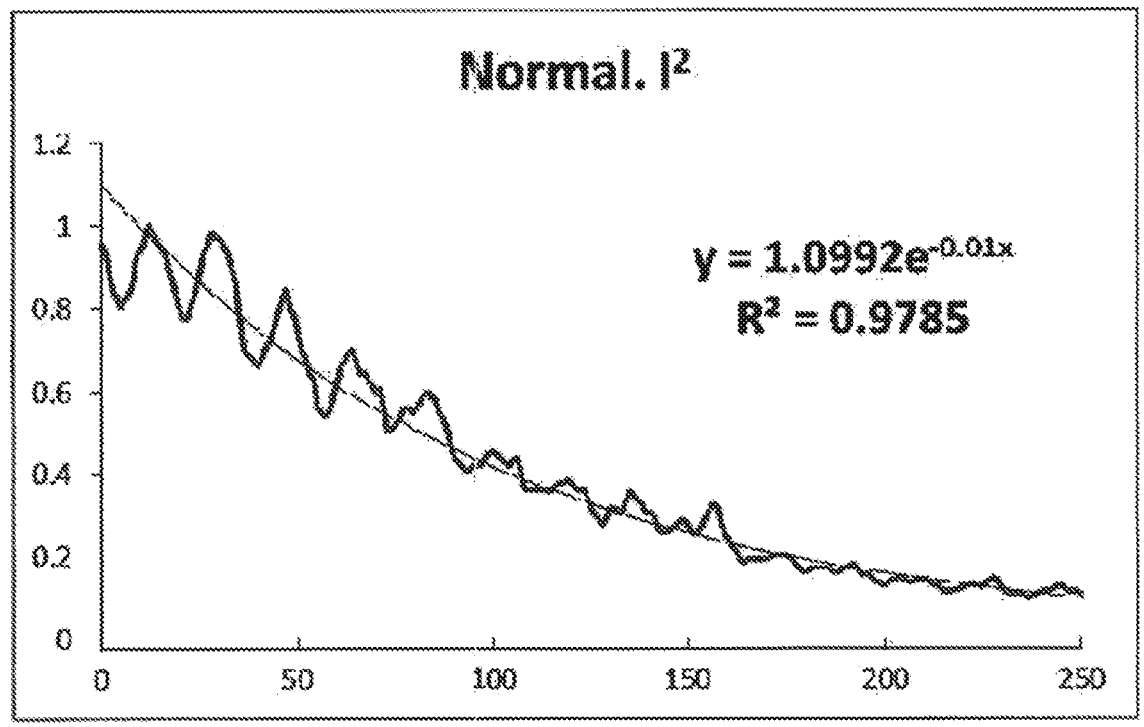

POLARIZING PLATE WITH ADHESIVE LAYER HAVING SPECIFIED HAZE AND LIQUID CRYSTAL DISPLAY DEVICE COMPRISING SAME

CROSS-REFERENCE TO RELATED APPLICATIONS

This application is a National Phase Patent Application and claims priority to and the benefit of International Application Number PCT/KR2017/010710, filed on Sep. 27, 2017, which claims priority to and the benefit of Korean Patent Application No. 10-2016-0143820, filed on Oct. 31, 2016, the entire contents of each of which are incorporated herein by reference.

FIELD

The present invention relates to a polarizing plate and a liquid crystal display including the same.

BACKGROUND

A liquid crystal display is operated to emit light through a liquid crystal panel after receiving the light from a backlight unit. Thus, the liquid crystal display provides a good front contrast ratio. However, the liquid crystal display has a poor side contrast ratio. Therefore, the liquid crystal display is required to increase the side contrast ratio while minimizing reduction in the front contrast ratio in order to improve visibility.

A liquid crystal display may always not be in operation. In addition, the liquid crystal display can be displayed in operation or in a non-driven state for the purpose of product demonstration or product sale. When a screen of the liquid crystal display in a non-driven state receives external light, rainbow spots or mura can be generated on the screen or reflected light can be split, thereby causing deterioration in appearance of the liquid crystal display. Particularly, when an anti-reflection film is attached to the outermost surface of the liquid crystal display, deterioration in appearance of the liquid crystal display can be more clearly observed.

Therefore, there is a need for a polarizing plate which can improve both the front and side contrast ratios of the liquid crystal display in operation while preventing deterioration in appearance when the liquid crystal display is not in operation.

One example of the background technique is disclosed in Japanese Unexamined Patent Publication No. 2006-251659.

SUMMARY

It is one object of the present invention to provide a polarizing plate which can prevent deterioration in appearance of a screen of an optical display due to external light when the optical display is not in operation.

It is another object of the present invention to provide a polarizing plate which can prevent generation of mura on a screen of an optical display due to external light when the optical display is not in operation.

It is a further object of the present invention to provide a polarizing plate which can increase relative brightness of an optical display and improve front and side contrast ratios of the optical display, or can minimize reduction in the front contrast ratio while increasing the side contrast ratio when the optical display is in operation.

In accordance with one aspect of the present invention, there is provided a polarizing plate including: a polarizer; a contrast ratio improvement film; an adhesive layer; and an anti-reflection film sequentially stacked, wherein the contrast ratio improvement film includes: a first protective layer; a first resin layer; and a second resin layer facing the first resin layer, the first resin layer includes a patterned portion formed on one surface thereof facing the second resin layer, the patterned portion includes optical patterns and a flat section formed between the optical patterns, and the adhesive layer has a haze of about 5% to about 40%.

The adhesive layer may include light scattering agents.

The light scattering agent may include at least one of (meth)acrylic based light scattering agents, urethane based light scattering agents, epoxy based light scattering agents, vinyl based light scattering agents, polyester based light scattering agents, polyamide based light scattering agents, polystyrene based light scattering agents, silicone based light scattering agents, titanium oxide, and zirconium oxide.

The light scattering agent may be present in an amount of about 0.1 wt % to about 25 wt % in the adhesive layer.

The anti-reflection film may have a minimum reflectance of about 0.5% or less.

The anti-reflection film may include a three-layer film in which a base layer, a high refractive hard coating layer, and a low refractive layer are sequentially stacked, as viewed from the adhesive layer.

The high refractive hard coating layer may have an index of refraction of about 1.50 to about 1.70.

The low refractive layer may have an index of refraction of about 1.25 to about 1.40.

The adhesive layer may have an index of refraction of about 1.40 to about 1.65.

The optical pattern may have a base angle of 75° to about 90°, and the patterned portion may satisfy Equation 1:

$$1 < P/W \leq 10 \qquad \text{<Equation 1>}$$

(wherein Equation 1, P is a pitch of the patterned portion (unit: μm) and

W is a maximum width of the optical pattern (unit: μm)).

The optical pattern may be composed of a first surface at a top portion thereof and at least one inclined plane connected to the first surface, wherein the inclined plane may be a flat surface or curved surface.

The optical pattern may have an aspect ratio of about 0.3 to about 3.0.

The first resin layer may have a higher index of refraction than the second resin layer.

An absolute value of a difference between indices of refraction of the first resin layer and the second resin layer may be about 0.05 to about 0.20.

In the contrast ratio improvement film, the second resin layer may directly adjoin the first resin layer, and the first resin layer may directly adjoin the first protective layer.

The first resin layer or the second resin layer may be an adhesive layer and the contrast ratio improvement film may be directly formed on the polarizer.

The first protective layer may have an in-plane retardation Re of about 8,000 nm or more, as measured at a wavelength of 550 nm and represented by Equation A:

$$Re = (n_x - n_y) \times d \qquad \text{<Equation A>}$$

(wherein Equation A, nx and ny are indices of refraction in slow axis and fast axis directions of the first protective layer at a wavelength of 550 nm, respectively, and d is a thickness of the first protective layer (unit: nm)).

The first protective layer may be formed of a polyester resin.

The polarizing plate may further include a second protective layer between the polarizer and the contrast ratio improvement film.

The second protective layer may have an in-plane retardation Re of about 8,000 nm or more, as measured at a wavelength of 550 nm and represented by Equation A:

$$Re=(nx-ny)\times d \qquad \text{<Equation A>}$$

(wherein Equation A, nx and ny are indices of refraction in slow axis and fast axis directions of the second protective layer at a wavelength of 550 nm, respectively, and d is a thickness of the second protective layer (unit: nm)).

In accordance with another aspect of the present invention, there is provided a liquid crystal display including the polarizing plate according to the present invention.

Embodiments of the present invention provide a polarizing plate which can prevent deterioration in appearance of a screen of an optical display due to external light when the optical display is not in operation.

Embodiments of the present invention provide a polarizing plate which can prevent generation of mura on a screen of an optical display due to external light when the optical display is not in operation.

Embodiments of the present invention provide a polarizing plate which can maintain a relative brightness of an optical display while improve side contrast ratios of the optical display when the optical display is in operation.

BRIEF DESCRIPTION OF THE DRAWINGS

FIG. 1 is a cross-sectional view of a polarizing plate according to one embodiment of the present invention.

FIG. 2 is a cross-sectional view of a stack of a first resin layer and a second resin layer of the polarizing plate of FIG. 1.

FIG. 3 is a cross-sectional view of a stack of a first resin layer and a second resin layer of a polarizing plate according to another embodiment of the present invention.

FIG. 4 is a cross-sectional view of a polarizing plate according to a further embodiment of the present invention.

FIG. 5 shows results of appearance evaluation of an optical display fabricated using a polarizing plate of Example 1, which is not in operation, and results of extraction of $R^2$, that is, a coefficient of determination.

FIG. 6 shows results of appearance evaluation of an optical display fabricated using a polarizing plate of Comparative Example 1, which is not in operation, and results of extraction of $R^2$, that is, a coefficient of determination.

DETAILED DESCRIPTION

Embodiments of the present invention will be described in detail with reference to the accompanying drawings to provide thorough understanding of the invention to those skilled in the art. It should be understood that the present invention may be embodied in different ways and is not limited to the following embodiments. In the drawings, portions irrelevant to the description will be omitted for clarity. Like components will be denoted by like reference numerals throughout the specification.

Herein, spatially relative terms such as "upper" and "lower" are defined with reference to the accompanying drawings. Thus, it will be understood that the term "upper surface" can be used interchangeably with the term "lower surface", and when an element such as a layer or a film is referred to as being placed "on" another element, it can be directly placed on the other element, or intervening element(s) may be present. On the other hand, when an element is referred to as being placed "directly on" another element, there are no intervening element(s) therebetween.

Herein, the terms "horizontal direction" and "vertical direction" means a longitudinal direction and a transverse direction of a rectangular screen of a liquid crystal display, respectively. As used herein, the term "side" refers to a region in which θ ranges from 60° to 90° in a spherical coordinate system represented by (φ, θ) in which a front side is indicated by (0°,0°), a left end point is indicated by (180°,90°), and a right end point is indicated by (0°, 90°) with reference to the horizontal direction.

Herein, the term "top portion (top part)" means the highest portion of an optical pattern.

Herein, "aspect ratio" refers to a ratio of maximum height of an optical pattern to maximum width thereof (maximum height/maximum width).

Herein, "pitch" refers to the sum of the maximum width W of one optical pattern and the width B of one flat section.

Herein, "in-plane retardation (Re)" is a value measured at a wavelength of 550 nm and represented by Equation A:

$$Re=(nx-ny)\times d \qquad \text{<Equation A>}$$

(wherein Equation A, nx and ny are the indices of refraction in the slow axis and fast axis directions of a protective layer at a wavelength of 550 nm, respectively, and d is the thickness of the protective layer (unit: nm)).

Herein, "haze" of an adhesive layer is measured using a haze meter. For example, the haze meter may be a typical haze meter, NDH 2000 (NIPPON DENSHOKU Industries Co., Ltd.), capable of measuring haze at a wavelength of 380 nm to 800 nm.

Herein, "minimum reflectance" of an anti-reflection film refers to the lowest value among reflectance values measured on a specimen prepared by laminating a black acrylic sheet (CLAREX, Nitto Jushi Kogyo Co., Ltd.) on a base layer of the anti-reflection film, using a reflectometer in the reflection mode at a wavelength of 320 nm to 800 nm.

Herein, the term "(meth)acryl" refers to acryl and/or methacryl.

Hereinafter, a polarizing plate according to one embodiment of the invention will be described with reference to FIGS. 1 and 2. FIG. 1 is a cross-sectional view of a polarizing plate according to one embodiment of the present invention. FIG. 2 is a cross-sectional view of a stack of a first resin layer and a second resin layer of the polarizing plate of FIG. 1.

Referring to FIG. 1, a polarizing plate 10 according to one embodiment of the invention may include a polarizer 100, a contrast ratio improvement film 200, an adhesive layer 400, and an anti-reflection film 500.

The polarizing plate according to this embodiment is used as a viewer side polarizing plate in a liquid crystal display and is affected by external light when the liquid crystal display is not in operation. In the polarizing plate according to this embodiment, the adhesive layer and the anti-reflection film are sequentially stacked, and the adhesive layer may have a haze of about 5% to about 40%. Within this range, a liquid crystal display using the polarizing plate according to this embodiment can prevent generation of mura or spots on a screen or tearing of a screen image due to external light when not in operation, such that appearance of the liquid crystal display and black luminosity of the screen can be considerably improved even when the liquid crystal display is not in operation. Although external light reflected from a metal electrode or a film interface of a liquid crystal panel is split according to wavelength due to diffraction and interference caused by a microstructure of the contrast ratio improvement film 200, the split reflected light beams are mixed again by the haze of the adhesive layer 400. The haze of the adhesive layer may be realized by a light scattering agent described below, without being limited thereto. The light scattering agent serves to allow the split reflected light beams to be mixed again.

In addition, in the polarizing plate according to this embodiment, the contrast ratio improvement film 200, the adhesive layer 400, and the anti-reflection film 500 are sequentially stacked. Thus, in operation, a liquid crystal display can have improved side contrast ratio due to the contrast ratio improvement film, and, when not in operation, the liquid crystal display can have good appearance due to the adhesive layer and the anti-reflection film. Particularly, even when the adhesive layer and the anti-reflection film are attached to the contrast ratio improvement film, improvement in side contrast ratio of the liquid crystal display in operation cannot be canceled.

The polarizer 100 serves to polarize incident light and may include any typical polarizer known in the art. Specifically, the polarizer may include a polyvinyl alcohol-based polarizer obtained by uniaxially stretching a polyvinyl alcohol film, or a polyene-based polarizer obtained by dehydrating a polyvinyl alcohol film. The polarizer 100 may have a thickness of about 5 μm to about 40 μm. Within this range, the polarizer can be used in an optical display.

The contrast ratio improvement film 200 is formed on the polarizer 100.

The contrast ratio improvement film 200 includes a first protective layer 300 and a stack 200A of a first resin layer and a second resin layer facing each other. The first resin layer has a higher index of refraction than the second resin layer. The first resin layer has a patterned portion on one surface thereof facing the second resin layer, wherein the patterned portion includes optical patterns and a flat section formed between the optical patterns. Thus, the contrast ratio improvement film 200 can diffuse polarized light received from the polarizer 100 and increase relative front brightness, improve both a front contrast ratio (CR) and a side contrast ratio, minimize reduction in the front contrast ratio while increasing the side contrast ratio, reduce a difference between the front contrast ratio and the side contrast ratio, and increase a contrast ratio for a given side viewing angle and front viewing angle.

The contrast ratio improvement film 200 may be formed on a light exiting surface of the polarizer 100 to transmit polarized light having passed through the polarizer 100. The first resin layer has a higher index of refraction than the second resin layer. Referring to FIG. 1, the second resin layer is formed on a surface of the polarizer 100 through which internal light, that is, light from a light source in a backlight unit of a liquid crystal display exits the polarizer, such that the second resin layer having a low index of refraction and the first resin layer having a high index of refraction are sequentially formed on the polarizer 100. However, it should be understood that the first resin layer may have a lower index of refraction than the second resin layer. In other words, the second resin layer having a higher index of refraction and the first resin layer having a lower index of refraction may be sequentially formed on the polarizer 100. In this case, the second resin layer may have an index of refraction of about 1.50 or more, specifically about 1.50 to about 1.70, and the first resin layer may have an index of refraction of less than about 1.52, specifically about 1.35 to less than about 1.50. When the indices of refraction of the first resin layer and second resin layer fall within these ranges, the contrast ratio improvement film can provide improved diffusion of polarized light, facilitate fabrication of the polarizing plate, and provide improved contrast ratio. An absolute value of a difference between indices of the second resin layer and the first resin layer may be about 0.20 or less, specifically about 0.05 to about 0.20, more specifically about 0.10 to about 0.15, for example, about 0.05, 0.06, 0.07, 0.08, 0.09, 0.10, 0.11, 0.12, 0.13, 0.14, 0.15, 0.16, 0.17, 0.18, 0.19, or 0.20. Within this range, the contrast ratio improvement film can provide considerably improved diffusion of concentrated light and improved contrast ratio.

Referring to FIG. 2, the stack 200A has a structure in which the first resin layer 210 is stacked on the second resin layer 220.

The first resin layer 210 may be formed on the first protective layer 300 and serves to diffuse light reaching the second resin layer 220 in the liquid crystal display, thereby providing improved light diffusion. Referring to FIG. 2, the second resin layer 220 is directly stacked on the first resin layer 210. The first resin layer 210 may be directly formed on the first protective layer 300 of FIG. 1.

The first resin layer 210 has a higher index of refraction than the second resin layer 220. A difference between indices of refraction of the first resin layer 210 and the second resin layer 220 may be about 0.20 or less, specifically about 0.05 to about 0.20, more specifically about 0.10 to about 0.15. Within this range, the contrast ratio improvement film can provide improved diffusion of concentrated light and contrast ratio. Particularly, when the difference in index of refraction ranges from about 0.10 to about 0.15, the contrast ratio improvement film can provide excellent diffusion of polarized light, thereby increasing brightness of an optical display for a given viewing angle.

The first resin layer 210 may have an index of refraction of about 1.50 or more, specifically about 1.50 to about 1.70, for example, about 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, or 1.70. Within this range, the contrast ratio improvement film can provide excellent light diffusion. The first resin layer 210 may be formed of a UV curable composition or thermosetting composition including at least one of (meth)acrylic, polycarbonate, silicone, and epoxy resins, without being limited thereto.

FIG. 2 shows an optical pattern. The optical pattern 211 is composed of two or more inclined planes 213 and a first surface 214 at a top portion thereof.

The first resin layer 210 may have a patterned portion including one or more optical patterns 211 and a flat section 212 formed between the optical patterns 211. The patterned portion may satisfy Equation 1 and the optical pattern 211 may have a base angle θ of about 75° to about 90°. Herein, the base angle θ refers to an angle formed by the inclined plane 213 of the optical pattern 211 and an imaginary line extending from the maximum width W of the optical pattern 211. Within this range, the contrast ratio improvement film can increase relative front brightness, improve both the front contrast ratio and the side contrast ratio, reduce a difference between the front contrast ratio and the side contrast ratio, and increase the contrast ratio at the same side viewing angle and at the same front viewing angle. Specifically, the base angle θ may range from about 80° to about 90°, for example, about 75°, 76°, 77°, 78°, 79°, 80°, 81°, 82°, 83°, 84°, 85°, 86°, 87°, 88°, 89°, or 90°, and P/W may be about 1.2 to about 8, for example, about 1.2, 2, 3, 4, 5, 6, 7, 8, 9, or 10.

$$1 < P/W \leq 10 \qquad \text{<Equation 1>}$$

(wherein Equation 1, P is the pitch of the patterned portion (unit: μm) and W is the maximum width of the optical pattern (unit: μm)).

Although FIG. 2 shows the structure wherein the optical pattern have the same base angle at both sides thereof, the optical pattern according to the present invention may have different base angles so long as the base angles range from about 75° to about 90°.

The flat section 212 can diffuse light and maintain the front contrast ratio and brightness by allowing light having reached the flat section to exit therethrough. A ratio (W/B) of the maximum width W of the optical pattern 211 to the width B of the flat section 212 may be about 9 or less, specifically about 0.1 to about 3, more specifically about 0.15 to about 2, for example, about 0.1, 1, 2, 3, 4, 5, 6, 7, 8, or 9. Within this range, the contrast ratio improvement film can increase relative front brightness, reduce the difference between the front contrast ratio and the side contrast ratio, and increase the contrast ratio for a given side viewing angle and front viewing angle. In addition, the contrast ratio improvement film can prevent the Moiré phenomenon. The flat section 212 may have a width B of about 1 μm to about 300 μm, specifically about 3 μm to about 50 μm. Within this range, the flat section can improve front brightness.

The optical pattern 211 may be an engraved optical pattern composed of the first surface 214 formed at the top portion thereof and one or more inclined planes connected to the first surface. The first surface 214 is formed at the top portion of the optical pattern so as to further diffuse light reaching the second resin layer in the optical display, thereby increasing viewing angle and brightness. Thus, the polarizing plate according to this embodiment can minimize brightness loss through improvement in light diffusion. Although FIG. 2 shows the structure wherein first surface 214 is a flat surface and is parallel to the flat section 212, the first surface 214 may have fine roughness or a curved surface. In the structure wherein the first surface 214 has a curved surface, the optical pattern may be realized as a lenticular lens pattern. The first surface 214 may have a width A of about 0.5 μm to about 30 μm, specifically about 2 μm to about 20 μm. Referring to FIG. 2, the optical pattern has a trapezoidal cross-sectional shape in which the first surface formed at the top portion is a flat surface and the inclined planes are flat surfaces (for example, a truncated prism pattern having a truncated triangular cross-section, that is, a truncated prism shape). Alternatively, as shown in FIG. 3, the optical pattern may have a shape in which the first surface is formed at the top portion thereof and the inclined planes are curved surfaces (for example, a stack 200B of a first resin layer and a second resin layer each having a truncated lenticular lens pattern, or a truncated micro-lens pattern).

The optical pattern 211 may have an aspect ratio H/W of about 0.3 to about 3.0, specifically about 0.4 to about 2.5, more specifically about 0.4 to about 1.5, for example, about 0.3, 0.5, 1.0, 1.5, 2.0, 2.5, or 3.0. Within this range, the optical pattern can improve the side contrast ratio and side viewing angle of the optical display.

The optical pattern 211 may have a height H of about 40 μm or less, specifically about 30 μm or less, more specifically about 5 μm to about 15 μm. Within this range, the optical pattern can provide improvement in contrast ratio, viewing angle, and brightness while preventing the Moiré phenomenon. Although the optical patterns of the patterned portion are shown as the same in height in FIG. 2, it should be understood that the optical patterns may have different heights or at least one of adjacent optical patterns may have a different height than the other ones.

The optical pattern 211 may have a maximum width W of about 80 μm or less, specifically about 50 μm or less, more specifically about 5 μm to about 20 μm. Within this range, the optical pattern can provide improvement in contrast ratio, viewing angle, and brightness while preventing the Moiré phenomenon. Although the optical patterns 211 of the patterned portion are shown as having the same maximum width in FIG. 2, it should be understood that the optical patterns may have different maximum widths or at least one of adjacent optical patterns may have a different maximum width than the other ones.

The pitch P may range from about 5 μm to about 500 μm, specifically from about 10 μm to about 50 μm. Within this range, the optical pattern can provide improvement in contrast ratio and brightness without causing the Moiré phenomenon. Although the pitches of the patterned portion are shown as the same in FIG. 2, it should be understood that the pitches may be different from one another or at least one of adjacent pitches may be different from the other pitches.

The second resin layer 220 serves to diffuse light by refracting light received from the optical display through a lower surface thereof in various directions depending on light incident position. The second resin layer 220 may directly adjoin the first resin layer 210. The second resin layer 220 may include a filling pattern 221 partially filling the optical pattern 211. As used herein, the expression "partially filling" means that the optical pattern is partially or completely filled with the filling pattern. In the structure wherein the optical pattern is partially filled with the filling pattern, a remaining portion of the optical pattern may be filled with air or a resin having a predetermined index of refraction. Specifically, the resin may have an index of refraction which is higher than or equal to that of the second resin layer or which is lower than or equal to that of the first resin layer. Although not shown in FIG. 2, the optical pattern may extend in a stripe shape, or may be formed in a dot shape. Here, the term "dot" means that the optical patterns are dispersed. Preferably, the optical pattern extends in a stripe shape.

The second resin layer 220 may have an index of refraction of less than about 1.52, specifically about 1.35 to less than about 1.50, for example, about 1.35, 1.36, 1.37, 1.38, 1.39, 1.40, 1.41, 1.42, 1.43, 1.44, 1.45, 1.46, 1.47, 1.48, or 1.49. Within this range, the second resin layer can provide improvement in light diffusion and contrast ratio and facilitate fabrication of the polarizing plate. The second resin layer 220 may be formed of a UV curable composition or thermosetting composition including a transparent resin. Specifically, the transparent resin may include at least one of (meth)acrylic, polycarbonate, silicone, and epoxy resins, without being limited thereto. The transparent resin may have a luminous transmittance of about 90% or more after curing.

Although the second resin layer 220 may be a non-adhesive film, the second resin layer 220 may be an adhesive layer formed of an adhesive resin to facilitate interlayer bonding or to eliminate a need to provide a separate polarizer protection layer for interlayer bonding, thereby reducing the thickness of the polarizing plate. The adhesive resin may be an acrylic resin, an epoxy resin, or a urethane resin.

Among the contrast ratio improvement film, the stack 200A of the first resin layer and the second resin layer may have a thickness of about 10 μm to about 100 μm, specifically about 20 µm to about 60 µm, more specifically about 20 µm to about 45 µm. Within this range, the stack can be sufficiently supported by the first protective layer and can be used in an optical display.

Referring to FIGS. 1 and 2, the contrast ratio improvement film 200 may have a structure in which the second resin layer 220 directly adjoins the first resin layer 210 and the first resin layer 210 directly adjoins the first protective layer 300, without being limited thereto. The first resin layer 210 may be directly formed on the first protective layer 300 or may be an adhesive layer formed of an adhesive resin to facilitate interlayer bonding.

Referring to FIG. 1 again, the first protective layer 300 is formed on the stack 200A of the first resin layer and the second resin layer to protect and support the stack 200A of the first resin layer and the second resin layer. The first protective layer 300 is a translucent layer that can transmit light having been diffused through the first resin layer.

The first protective layer 300 may be a retardation film having a predetermined range of retardation or an isotropic optical film. In one embodiment, the first protective layer may have an in-plane retardation Re of about 8,000 nm or more, specifically about 10,000 nm or more, more specifically greater than about 10,000 nm, more specifically about 10,100 nm to about 15,000 nm. Within this range, the first protective layer can prevent generation of rainbow spots while further diffusing light having been diffused through the stack of the second resin layer and the first resin layer. In another embodiment, the first protective layer may be an isotropic optical film having an in-plane retardation Re of about 60 nm or less, specifically about 0 nm to about 60 nm, more specifically about 40 nm to about 60 nm. Within this range, the first protective layer can provide good image quality through compensation for viewing angle. Herein, the term "isotropic optical film" means a film having substantially the same nx, ny and nz. Herein, the expression "substantially the same" include not only the case where nx, ny and nz are completely the same, but also the case where there is an acceptable margin of error between nx, ny and nz. Preferably, the first protective layer is a retardation film having an in-plane retardation Re of about 8,000 nm or more, specifically about 10,000 nm or more, more specifically more than about 10,000 nm.

The first protective layer 300 may have a thickness of about 30 µm to about 120 µm, specifically about 20 µm to about 80 µm. Within this range, the first protective layer can be used in an optical display. The first protective layer 300 may have a luminous transmittance of about 80% or more, specifically about 85% to about 95%, as measured in the visible region. The first protective layer 300 may include a film obtained by uniaxially or biaxially stretching an optically transparent resin. Specifically, the optically transparent resin may include at least one selected from among polyesters such as polyethylene terephthalate (PET), polybutylene terephthalate, polyethylene naphthalate, and polybutylene naphthalate, cellulose esters such as acryl, cyclic olefin polymer (COP), and triacetyl cellulose (TAC) resins, polyvinyl acetate, polyvinyl chloride (PVC), polynorbornene, polycarbonate (PC), polyamide, polyacetal, polyphenylene ether, polyphenylene sulfide, polysulfone, polyether sulfone, polyarylate, and polyimide. Preferably, the first protective layer includes a film formed of a polyester resin. The first protective layer may include a film formed of the optically transparent resin subjected to modification. Here, modification may include copolymerization, branching, crosslinking, modification of molecular terminals, and the like.

Although not shown in FIG. 1, the first protective layer may include a base film and a primer layer formed on at least one surface of the base film. The base film supports the first protective layer and may have a refraction index ratio in a predetermined range with respect to the primer layer, thereby improving transmittance of the first protective layer. Specifically, a refractive index ratio of the primer layer to the base film (index of refraction of the primer layer/index of refraction of the base film) may be about 1.0 or less, specifically about 0.6 to about 1.0, more specifically about 0.69 to about 0.95, still more specifically about 0.7 to about 0.9, still more specifically about 0.72 to about 0.88. Within this range, the first protective layer can have increased transmittance. The base film may have an index of refraction of about 1.3 to about 1.7, specifically about 1.4 to about 1.6. Within this range, the base film can be applied to the first protective layer, can facilitate regulation of the index of refraction with respect to the primer layer, and can improve transmittance of the first protective layer. The base film may be formed of the optically transparent resin. The primer layer is formed between the base film and the first resin layer and can enhance adhesion between the base film and the first resin layer. The primer layer may have an index of refraction of about 1.0 to about 1.6, specifically about 1.1 to about 1.6, more specifically about 1.1 to about 1.5. Within this range, the primer layer can be used in the optical film and has a suitable index of refraction relative to that of the base film, thereby improving transmittance of the base layer. The primer layer may have a thickness of about 1 nm to about 200 nm, specifically about 60 nm to about 200 nm. Within this range, the primer layer can be used in the optical film and has a suitable index of refraction relative to that of the base film, thereby increasing transmittance of the base layer without embrittlement. The primer layer may be a non-urethane based primer layer that does not contain a urethane group. Specifically, the primer layer may be formed of a primer layer composition including resins such as a polyester resin and an acryl resin, or monomers. A mixing ratio (for example, molar ratio) of the monomers may be properly controlled to provide an index of refraction in the aforementioned range. The primer layer composition may further include at least one additive selected from among a UV absorber, an antistatic agent, an antifoaming agent, a surfactant, and the like.

The adhesive layer 400 may be formed on the first protective layer 300 to attach the first protective layer 300 to the anti-reflection film 500.

The adhesive layer 400 may have a haze of about 5% to about 40%, preferably about 10% to about 40%, for example, about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, or 40%. Within this range, the adhesive layer can improve appearance and black luminosity when the optical display is not in operation, and prevent reduction in side contrast ratio due to the contrast ratio improvement film when the optical display is in operation.

The adhesive layer 400 may include a light scattering agent. Thus, the adhesive layer can easily realize a haze in the aforementioned range and scatter light received from the outside, thereby improving black luminosity when the optical display is not in operation. The light scattering agent may include at least one of inorganic, organic, and organic-inorganic hybrid light-scattering agents. The inorganic, organic, and organic-inorganic hybrid light-scattering agents may include any typical inorganic, organic, and organic-inorganic hybrid light-scattering agents known in the art. Preferably, the light scattering agent includes an organic light scattering agent. Specifically, the light scattering agent may include at least one of organic particles of polymer resins including (meth)acrylic resins, such as poly(methyl methacrylate) or methacrylic acid ester copolymers, urethane resins, epoxy resins, vinyl resins, polyester resins, polyamide resins, polystyrene resins, and silicone resins, and inorganic particles of titanium oxide, zirconium oxide, and the like.

Although the light scattering agent is not limited to a particular shape, the light scattering agent may include spherical particles having an average particle diameter (D50) of about 0.5 μm to about 50 μm, preferably about 1 μm to about 10 μm, for example, about 0.5 μm, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, 49 μm, or 50 μm. Within this range, the light scattering agent can be included in the adhesive layer and provide sufficient light scattering, thereby improving black luminosity of the optical display.

The light scattering agent may have an index of refraction of about 1.35 to about 1.65, preferably about 1.40 to about 1.60, for example, about 1.35, 1.40, 1.45, 1.50, 1.55, 1.60, or 1.65. Within this range, a refractive index ratio of the light scattering agent to an adhesive resin can be easily controlled, thereby providing sufficient light scattering.

The light scattering agent may be present in an amount of about 0.1 wt % to about 25 wt %, for example about 1 wt % to about 25 wt %, for example, about 0.1 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt % in the adhesive layer. Within this range, the adhesive layer can provide light scattering and have sufficient adhesive strength to attach the first protective layer to the anti-reflection film.

The adhesive layer 400 may be formed of an adhesive layer composition including the light scattering agent, an adhesive resin, and a curing agent. The adhesive resin may include at least one of (meth)acrylic, epoxy, silicone, and urethane adhesive resins. The curing agent may include any typical curing agent known in the art. For example, the curing agent may include at least one selected from among isocyanate, epoxy, melamine, aziridine, and amine curing agents. The adhesive layer composition may further include at least one of a silane coupling agent, a crosslinking agent, and various additives.

The adhesive layer 400 may have an index of refraction of about 1.40 to about 1.65, for example, about 1.40, 1.45, 1.50, 1.55, 1.60, or 1.65. Within this range, the adhesive layer can improve transparency between the other stacked films.

The adhesive layer 400 may have a thickness of about 1 μm to about 50 μm, preferably about 5 μm to about 20 μm. Within this range, the adhesive layer can be used in the polarizing plate and retain appropriate adhesive strength.

The anti-reflection film 500 may have a minimum reflectance of about 0.5% or less. Within this range, the anti-reflection film can suppress reflection of external light and provide black luminosity when the optical display is not in operation. Preferably, the anti-reflection film has a minimum reflectance of about 0.05% to about 0.3%, for example, about 0.05%, 0.1%, 0.15%, 0.20%, 0.25%, 0.30%, 0.35%, 0.40%, 0.45%, or 0.5%. Within this range, the anti-reflection film can further improve contrast ratio.

Although not shown in FIG. 1, the anti-reflection film 500 may have a structure in which a base layer, a high refractive hard coating layer, and a low refractive layer are sequentially stacked, as viewed from the adhesive layer 400.

The base layer may be formed on the adhesive layer to secure the anti-reflection film to the adhesive layer. The base layer is an optically transparent resin film and may include at least one selected from polyesters such as polyethylene terephthalate (PET), polybutylene terephthalate, polyethylene naphthalate, and polybutylene naphthalate, cellulose esters such as acryl, cyclic olefin polymer (COP), and triacetyl cellulose (TAC), polyvinyl acetate, polyvinyl chloride (PVC), polynorbornene, polycarbonate (PC), polyamide, polyacetal, polyphenylene ether, polyphenylene sulfide, polysulfone, polyether sulfone, polyarylate, and polyimide. The base layer may have a thickness of about 10 μm to about 150 μm, specifically about 30 μm to about 100 μm, more specifically about 40 μm to about 90 μm. Within this range, the base film can secure hardness of the anti-reflection film and can be used in the anti-reflection film.

The high refractive hard coating layer can reduce minimum reflectance of the anti-reflection film and increase hardness and scratch resistance of the anti-reflection film. The high refractive hard coating layer may be formed of a composition including a highly refractive monomer, a UV curable monomer having a lower index of refraction than the highly refractive monomer or an oligomer thereof, an antistatic agent, and an initiator.

The high refractive hard coating layer may have an index of refraction of about 1.50 to about 1.70, preferably about 1.51 to about 1.65, for example, about 1.50, 1.55, 1.60, 1.65, or 1.70. Within this range, the high refractive hard coating layer can reduce minimum lowest reflectance of the anti-reflection film in cooperation with the low refractive layer stacked thereon.

The high refractive hard coating layer may have a thickness of about 1 μm to about 50 μm, specifically about 1 μm to about 30 μm, more specifically about 3 μm to about 10 μm, or about 5 μm to about 10 μm. Within this range, the high refractive hard coating layer can be used in the anti-reflection film and can secure hardness of the anti-reflection film.

The low refractive layer can reduce minimum reflectance of the anti-reflection film. The low refractive layer may be formed of a composition including inorganic particles such as hollow silica, a fluorine-containing monomer or an oligomer thereof, a fluorine-free monomer or an oligomer thereof, an initiator, and various additives.

The low refractive layer may have an index of refraction of about 1.20 to about 1.50, about 1.25 to about 1.40, for example, about 1.27 to about 1.31, for example, about 1.20, 1.25, 1.30, 1.35, 1.40, 1.45, or 1.50. Within this range, the low refractive layer can reduce minimum reflectance of the anti-reflection film, thereby suppressing reflection of external light and providing black luminosity when the optical display is not in operation.

The low refractive layer may have a thickness of about 50 nm to about 1,000 nm, specifically about 80 nm to about 500 nm, more specifically about 80 nm to about 150 nm or about 100 nm to about 130 nm. Within this range, the low refractive layer can be used in the anti-reflection film.

Although not shown in FIG. 1, an adhesive layer or a bonding layer may be formed between the polarizer and the contrast ratio improvement film. The adhesive layer or the bonding layer may be formed of any typical composition known in the art. However, when the second resin layer of the contrast ratio improvement film is an adhesive, the contrast ratio improvement film may be directly formed on the polarizer.

In addition, although not shown in FIG. 1, a protective layer may be further formed on a lower or upper surface of the polarizer to suppress penetration of external moisture into the polarizer while increasing mechanical strength of the polarizing plate. The protective layer may be formed of a material the same as or different from that of a second protective layer as described further below.

Although not shown in FIG. 1, an optically transparent protective film may be further formed between the adhesive layer and the anti-reflection film. The protective film may be formed of a resin the same as or different from that of the first protective layer.

Hereinafter, a polarizing plate according to another embodiment of the invention will be described with reference to FIG. 4. FIG. 4 is a cross-sectional view of the polarizing plate according to this embodiment of the present invention.

Referring to FIG. 4, a polarizing plate 20 according to this embodiment is substantially the same as the polarizing plate 10 according to the above embodiment of the invention except that a second protective layer 600 is further formed between the polarizer 100 and the contrast ratio improvement film 200.

The second protective layer 600 serves to protect the polarizer 100 while increasing mechanical strength of the polarizing plate. The second passivation layer 600 may have a total luminous transmittance of 90% or more, specifically about 90% to about 100%, as measured in the visible range.

The second protective layer 600 may include at least one of an optically transparent protective film and an optically transparent protective coating layer.

When the second protective layer is a protective film, the second protective layer may be formed of an optically transparent resin. The protective film may be formed through melting and extrusion of the resin. The resin may be further subjected to stretching, as needed. The resin may include at least one of the resins as set forth above. The protective film may be an optically transparent liquid crystal film.

When the second protective layer is a protective coating layer, the second protective layer can provide excellent properties in terms of adhesion to the polarizer, transparency, mechanical strength, thermal stability, moisture blocking and durability. In one embodiment, the protective coating layer may be formed of an actinic radiation-curable resin composition including an actinic radiation-curable compound and a polymerization initiator. The actinic radiation-curable compound may include at least one of a cationic polymerizable curable compound, a radical polymerizable curable compound, a urethane resin, and a silicone resin. The cationic polymerizable curable compound may be an epoxy compound having at least one epoxy group per molecule, or an oxetane compound having at least one oxetane ring per molecule. The radical polymerizable curable compound may be a (meth)acrylic compound having at least one (meth)acryloyloxy group per molecule. The epoxy compound may be at least one of a hydrogenated epoxy compound, an acyclic aliphatic epoxy compound, a cyclic aliphatic epoxy compound, and an aromatic epoxy compound. The radical polymerizable curable compound can realize a protective coating layer having excellent hardness and mechanical strength and high durability. Examples of the radical polymerizable curable compound may include a (meth)acrylate monomer having at least one (meth)acryloyloxy group per molecule and a (meth)acrylate oligomer obtained by reacting two or more functional group-containing compounds and having at least two (meth)acryloyloxy groups per molecule. Examples of the (meth)acrylate monomer may include a monofunctional (meth)acrylate monomer having one (meth)acryloyloxy group per molecule, a bifunctional (meth)acrylate monomer having two (meth)acryloyloxy groups per molecule, and a polyfunctional (meth)acrylate monomer having three or more (meth)acryloyloxy groups per molecule. Examples of the (meth)acrylate oligomer may include a urethane (meth)acrylate oligomer, a polyester (meth)acrylate oligomer, and an epoxy (meth)acrylate oligomer. The polymerization initiator can cure the actinic radiation-curable compound. The polymerization initiator may include at least one of a photo-cationic initiator and a photosensitizer.

The photo-cationic initiator may include any typical photo-cationic initiator known in the art. Specifically, the photo-cationic initiator may be an onium salt including a cation and an anion. Examples of the cation may include diaryl iodonium such as diphenyliodonium, 4-methoxydiphenyliodonium, bis(4-methylphenyl)iodonium, bis(4-tert-butylphenyl)iodonium, bis(dodecylphenyl)iodonium, and (4-methylphenyl)[(4-(2-methylpropyl)phenyl)iodonium, triarylsulfonium such as triphenylsulfonium and diphenyl-4-thiophenoxyphenylsulfonium, and bis[4-(diphenylsulfonio)phenyl]sulfide. Examples of the anion may include hexafluorophosphate, tetrafluoroborate, hexafluoroantimonate, hexafluoroarsenate, and hexachloroantimonate. The photosensitizer may be any typical photosensitizer known in the art. Specifically, the photosensitizer may include at least one selected from thioxanthone, phosphorus, triazine, acetophenone, benzophenone, benzoin, and oxime photosensitizers. The polymerization initiator may be present in an amount of about 0.01 parts by weight to about 10 parts by weight relative to 100 parts by weight of the actinic radiation-curable compound. When the amount of the polymerization initiator falls within this range, the actinic radiation-curable compound can be sufficiently cured and thus can have high mechanical strength and good adhesion to the polarizer. The actinic radiation-curable resin composition may further include typical additives such as a silicon leveling agent, a UV absorber, and an antistatic agent. The additives may be present in an amount of about 0.01 parts by weight to about 1 part by weight relative to 100 parts by weight of the actinic radiation-curable compound. The protective coating layer may be a liquid crystal coating layer.

The second protective layer 600 may have a retardation and thickness the same as or different from those of the first protective layer and may be formed of a material the same as or different from that of the first protective layer.

The second protective layer 600 may have a thickness of about 5 μm to about 200 μm, specifically about 30 μm to about 120 μm. Specifically, when the second protective layer is a protective film, the second protective layer may have a thickness of about 50 μm to about 100 μm, and, when the second protective layer is a protective coating layer, the second protective layer may have a thickness of about 5 μm to about 50 μm. Within this range, the second protective layer can be used in a light emitting display.

A liquid crystal display according to the present invention may include the polarizing plate according to the present invention on the viewer side with respect to a liquid crystal panel. Herein, the term "polarizing plate on the viewer side"

refers to a polarizing plate placed on the side of a screen of the liquid crystal panel, that is, placed opposite a light source of the liquid crystal panel.

In one embodiment, the liquid crystal display may include a backlight unit, a first polarizing plate, a liquid crystal panel, and a second polarizing plate, which are sequentially stacked in the stated order, wherein the second polarizing plate may include the polarizing plate according to the present invention. The liquid crystal panel may employ a vertical alignment (VA) mode, an IPS mode, a patterned vertical alignment (PVA) mode, or a super-patterned vertical alignment (S-PVA) mode, without being limited thereto.

Next, the present invention will be described in more detail with reference to some examples. However, it should be noted that these examples are provided for illustration only and are not to be construed in any way as limiting the present invention.

Example 1

A UV curable resin (SSC-5760, Shin-A T&C) was coated onto one surface of a PET film for a first protective layer (thickness: 80 μm, Re at a wavelength of 550 nm: 14,000 nm, Toyobo Co., Ltd.) to form a coating layer. Then, a film having a patterned portion, which includes optical patterns each having the same base angles at both sides thereof and a flat section formed between the optical patterns, was applied to the coating layer, followed by curing, thereby forming a first resin layer having a patterned portion including optical patterns each having the same base angles at both sides thereof (optical patterns each having a trapezoidal cross-section as shown in FIG. 1) and a flat section formed therebetween. Then, a UV curable resin (SSC-4560, Shin-A T&C) was coated onto the first resin layer, thereby forming a contrast ratio improvement film which includes a second resin layer having a filling pattern completely filling the optical patterns.

A polarizer was prepared by stretching a polyvinyl alcohol film at 60° C. to 3 times an initial length thereof and adsorbing iodine to the stretched film, followed by stretching the film to 2.5 times the stretched length of the film in an aqueous solution of boric acid at 40° C.

100 parts by weight of an acrylic copolymer comprising 99 parts by weight of butyl acrylate and 1 part by weight of hydroxyethyl acrylate, 1.36 parts by weight of silicone beads (Sekisui Chemical, average particle diameter: 2 μm), and 0.78 parts by weight of an isocyanate curing agent were diluted with 300 parts by weight of methylethylketone (MEK), thereby preparing an adhesive layer composition. Here, the silicone beads were present in an amount of 1.33 wt % in the adhesive layer composition in terms of solid content.

As an anti-reflection film, a three-layer film (Toppan Printing CO., LTD) in which a high refractive hard coating layer and a low refractive layer were sequentially stacked on a base layer of a triacetyl cellulose film was used. Here, the anti-reflection film had a minimum reflectance of 0.3%.

A COP film (ZEON Corporation) and a PET film (Toyobo Co., Ltd., thickness: 80 μm) were attached to opposite surfaces of the polarizer through an adhesive for a polarizing plate (Z-200, Nippon Goshei Co., Ltd.), respectively.

An acrylic resin adhesive (the adhesive layer composition excluding the silicone beads) was applied to one surface of the second resin layer of the contrast ratio improvement film, followed by attachment of the PET film of the polarizer thereto. Then, the adhesive layer composition was coated onto the other surface of the PET film for the first protective layer, followed by drying, and the anti-reflection film was stacked on the coated adhesive layer composition such that the base layer adjoined the adhesive layer, thereby fabricating a polarizing plate. Here, the adhesive layer had a haze of 10%.

Examples 2 to 4

A polarizing plate was fabricated in the same manner as in Example 1 except that the amount of silicone beads in the adhesive layer and haze of the adhesive layer were changed as listed in Table 1.

Comparative Example 1

A polarizing plate was fabricated in the same manner as in Example 1 except that the silicone beads were not included in the adhesive layer.

Liquid crystal display modules were fabricated using the polarizing plates of Examples and Comparative Examples.

Preparative Example 1: Fabrication of First Polarizing Plate

A first polarizer was prepared by stretching a polyvinyl alcohol film to 3 times an initial length thereof at 60° C., and adsorbing iodine to the stretched film, followed by stretching the film to 2.5 times the stretched length of the film in an aqueous solution of boric acid at 40° C. As a base layer, a triacetyl cellulose film (thickness 80 μm) was attached to both surfaces of the first polarizer using an adhesive for a polarizing plate (Z-200, Nippon Goshei Co., Ltd.), thereby fabricating a first polarizing plate.

Preparative Example 2: Fabrication of Liquid Crystal Display Module

The first polarizing plate of Preparative Example 1, a liquid crystal panel (PVA mode), and each of the polarizing plates prepared in Examples and Comparative Examples were sequentially assembled, thereby fabricating a liquid crystal display module. Here, each of the polarizing plates prepared in Examples and Comparative Examples was used as a viewer side polarizing plate and the anti-reflection film was placed on the outermost position with respect to the viewer side.

Schematic configurations of each of the fabricated liquid crystal display modules are shown in Table 1. Each of the fabricated liquid crystal display modules using the polarizing plates prepared in Examples and Comparative Examples was evaluated as to the following properties. Results are shown in Table 1, FIG. 5 and FIG. 6.

(1) Side contrast ratio of optical display in operation: Contrast ratio was measured in a spherical coordinate system (0°, 60°) using an EZCONTRAST X88RC (EZXL-176R-F422A4, ELDIM S.A.).

(2) Appearance of optical display not in operation: A 3-wavelength fluorescent lamp (OSRAM) was placed at a height of 30 cm above the liquid crystal panel and then turned on, followed by acquiring a reflection image of the liquid crystal display, and then intensity I of dispersed reflected light was extracted on a pixel-by-pixel basis using an image analysis program (ImageJ) (the extracted position is indicated by a red dotted line in the graph of Example 1 and a total of 250 pixel intensities were extracted). The extracted intensity I was divided by the maximum value, followed by squaring to perform plotting (graphing). Then, the trend line of an exponential function ($y=ae^{bx}$) was determined using Excel with the graphed raw data, thereby extracting $R^2$, a coefficient of determination. Here, an $R^2$ value closer to 1 indicates better appearance and a smaller $R^2$ value indicates larger intensity amplitude, which means that diffracted light is prominent.

TABLE 1

| | | Example 1 | Example 2 | Example 3 | Example 4 | Comparative Example 1 |
|---|---|---|---|---|---|---|
| First resin layer | Type of optical pattern | Cut-prism | Cut-prism | Cut-prism | Cut-prism | Cut-prism |
| | Width of first surface (planar surface) of optical pattern (μm) | 6 | 6 | 6 | 6 | 6 |
| | Maximum width (W) of optical pattern (μm) | 7 | 7 | 7 | 7 | 7 |
| | Height of optical pattern (μm) | 7 | 7 | 7 | 7 | 7 |
| | Width of flat section (μm) | 7 | 7 | 7 | 7 | 7 |
| | Pitch (P) (μm) | 14 | 14 | 14 | 14 | 14 |
| | Base angle of optical pattern (°) | 86 | 86 | 86 | 86 | 86 |
| | Index of refraction | 1.59 | 1.59 | 1.59 | 1.59 | 1.59 |
| Second resin layer | Index of refraction | 1.47 | 1.47 | 1.47 | 1.47 | 1.47 |
| | Content of light scattering agent in adhesive layer (wt %) | 1.33 | 2.84 | 4.94 | 25 | 0 |
| | Haze of adhesive layer (%) | 10 | 20 | 30 | 40 | 2 |
| | Minimum reflectance of anti-reflection film (%) | 0.3 | 0.3 | 0.3 | 0.3 | 0.3 |
| | Contrast ratio of display in operation (0°, 60°) | 102 | 103 | 105 | 106 | 100 |
| | Appearance of display in operation | 0.9818 | 0.9813 | 0.9851 | 0.9921 | 0.9785 |

As shown in Table 1 and FIG. 5, it was confirmed that the polarizing plate of the Examples could prevent deterioration in appearance of a screen of the optical display not in operation due to external light, and prevent generation of mura on the screen of the optical display due to external light since the optical display had an $R^2$ close to 1 when not in operation. In addition, the polarizing plate according to Examples could improve side contrast ratio of the optical display in operation.

Conversely, as shown in Table 1 and FIG. 6, it was confirmed that the optical display fabricated using the polarizing plate of Comparative Example 1 in which the haze of the adhesive layer was outside the range specified herein had poor screen appearance due to external light when not in operation since the optical display had an $R^2$ of 0.9785.

It should be understood that various modifications, changes, alterations, and equivalent embodiments can be made by those skilled in the art without departing from the spirit and scope of the invention.

The invention claimed is:

1. A polarizing plate, comprising: a polarizer; a contrast ratio improvement film; an adhesive layer; and an anti-reflection film sequentially stacked in the stated order,
   wherein the contrast ratio improvement film comprises: a first protective layer; a first resin layer; and a second resin layer facing the first resin layer,
   the first resin layer comprises a patterned portion on one surface thereof facing the second resin layer, the patterned portion comprising optical patterns and a flat section formed between the optical patterns,
   the contrast ratio improvement film is located on a light exiting surface of the polarizer and is between the light exiting surface of the polarizer and the adhesive layer, and
   the adhesive layer has a haze of about 5% to about 40%.

2. The polarizing plate according to claim 1, wherein the adhesive layer comprises light scattering agents.

3. The polarizing plate according to claim 2, wherein the light scattering agents comprise at least one of (meth)acrylic based light scattering agents, urethane based light scattering agents, epoxy based light scattering agents, vinyl based light scattering agents, polyester based light scattering agents, polyamide based light scattering agents, polystyrene based light scattering agents, silicone based light scattering agents, titanium oxide, and zirconium oxide.

4. The polarizing plate according to claim 2, wherein the light scattering agents are present in an amount of about 0.1 wt % to about 25 wt % in the adhesive layer.

5. The polarizing plate according to claim 1, wherein the anti-reflection film has a minimum reflectance of about 0.5% or less.

6. The polarizing plate according to claim 1, wherein the anti-reflection film comprises a three-layer film in which a base layer, a high refractive hard coating layer, and a low refractive layer are sequentially stacked, as viewed from the adhesive layer.

7. The polarizing plate according to claim 6, wherein the high refractive hard coating layer has an index of refraction of about 1.50 to about 1.70.

8. The polarizing plate according to claim 6, wherein the low refractive layer has an index of refraction of about 1.25 to about 1.40.

9. The polarizing plate according to claim 1, wherein the adhesive layer has an index of refraction of about 1.40 to about 1.65.

10. The polarizing plate according to claim 1, wherein at least one optical pattern of the optical patterns has a base angle of 75° to about 90°, and the patterned portion satisfies Equation 1:

$$1 < P/W \leq 10 \qquad \text{<Equation 1>}$$

where, in Equation 1, P is a pitch of the patterned portion (unit: μm) and

W is a maximum width of the at least one optical pattern (unit: μm).

11. The polarizing plate according to claim 1, wherein at least one optical pattern of the optical patterns is composed of a first surface at a top portion thereof and at least one inclined plane connected to the first surface, the inclined plane being a flat or curved surface.

12. The polarizing plate according to claim 1, wherein at least one optical pattern of the optical patterns has an aspect ratio of about 0.3 to about 3.0.

13. The polarizing plate according to claim 1, wherein the first resin layer has a higher index of refraction than the second resin layer.

14. The polarizing plate according to claim 1, wherein an absolute value of a difference between indices of refraction of the first resin layer and the second resin layer ranges from about 0.05 to about 0.20.

15. The polarizing plate according to claim 1, wherein, in the contrast ratio improvement film, the second resin layer directly adjoins the first resin layer and the first resin layer directly adjoins the first protective layer.

16. The polarizing plate according to claim 1, wherein the first resin layer or the second resin layer is an adhesive layer and the contrast ratio improvement film is directly formed on the polarizer.

17. The polarizing plate according to claim 1, wherein the first protective layer has an in-plane retardation Re of about 8,000 nm or more, as measured at a wavelength of 550 nm and represented by Equation A:

$$Re = (nx - ny) \times d \qquad \text{<Equation A>}$$

where, in Equation A, nx and ny are indices of refraction in slow axis and fast axis directions of the first protective layer at a wavelength of 550 nm, respectively, and d is a thickness of the first protective layer (unit: nm).

18. The polarizing plate according to claim 1, wherein the first protective layer is formed of a polyester resin.

19. The polarizing plate according to claim 1, further comprising: a second protective layer between the polarizer and the contrast ratio improvement film.

20. The polarizing plate according to claim 19, wherein the second protective layer has an in-plane retardation Re of about 8,000 nm or more, as measured at a wavelength of 550 nm and represented by Equation A:

$$Re = (nx - ny) \times d \qquad \text{<Equation A>}$$

where, in Equation A, nx and ny are indices of refraction in slow axis and fast axis directions of the second protective layer at a wavelength of 550 nm, respectively, and d is a thickness of the second protective layer (unit: nm).

21. A liquid crystal display comprising the polarizing plate according to claim 1.

* * * * *